(12) United States Patent
Lamparter et al.

(10) Patent No.: US 11,593,736 B2
(45) Date of Patent: Feb. 28, 2023

(54) METHOD FOR PRODUCTION PLANNING

(71) Applicant: SIEMENS AKTIENGESELLSCHAFT, Munich (DE)

(72) Inventors: Steffen Lamparter, Feldkirchen (DE); Matthias Loskyll, Neumarkt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/636,447

(22) PCT Filed: Aug. 3, 2018

(86) PCT No.: PCT/EP2018/071147
§ 371 (c)(1),
(2) Date: Feb. 4, 2020

(87) PCT Pub. No.: WO2019/025594
PCT Pub. Date: Feb. 7, 2019

(65) Prior Publication Data
US 2020/0175447 A1    Jun. 4, 2020

(30) Foreign Application Priority Data
Aug. 4, 2017   (DE) ..................... 10 2017 213 583.2

(51) Int. Cl.
*G06Q 10/06* (2012.01)
*G06Q 50/04* (2012.01)
(Continued)

(52) U.S. Cl.
CPC . *G06Q 10/06315* (2013.01); *G05B 19/41865* (2013.01); *G06Q 10/0633* (2013.01); *G06Q 50/04* (2013.01); *G05B 2219/40515* (2013.01)

(58) Field of Classification Search
None
See application file for complete search history.

(56) References Cited

U.S. PATENT DOCUMENTS 6,356,880 B1 * 3/2002 Goossens ............... G06Q 10/06
705/30
7,139,719 B1 11/2006 Cherneff et al.
(Continued)

FOREIGN PATENT DOCUMENTS

CN        104636852 A    5/2015
DE    102013104354 A1    5/2014
(Continued)

OTHER PUBLICATIONS

Gahagan "Simulation and optimization of prodution control for lean manufacturing transition" (2008) (https://drum.lib.umd.edu/bitstream/handle/1903/8358/umi-umd-5649.pdf?sequence=1) (Year: 2008).*
(Continued)

*Primary Examiner* — Sujay Koneru
(74) *Attorney, Agent, or Firm* — Lempia Summerfield Katz LLC

(57) ABSTRACT

The invention relates to a production planning method using a plurality of manufacturing devices (INTMA) according to which tasks (TD) of a work plan (BOP) are compared (MA) with manufacturing capabilities (SD) of the manufacturing devices (INTMA) and, depending on the one or more results (MAQ) of said comparison (MA), at least one or more manufacturing devices (INTMA) are commissioned to match their manufacturing capabilities (SD) with the task(s) (TD).

9 Claims, 1 Drawing Sheet

(51) Int. Cl.
*G05B 19/418* (2006.01)
*G06Q 10/0631* (2023.01)
*G06Q 10/0633* (2023.01)

(56) References Cited

U.S. PATENT DOCUMENTS

| | | | | |
|---|---|---|---|---|
| 7,684,891 | B2* | 3/2010 | Okrongli | G05B 19/4083 700/181 |
| 2002/0107600 | A1* | 8/2002 | Crampton | G06Q 10/06 700/99 |
| 2003/0069658 | A1* | 4/2003 | Yamazaki | G06Q 10/0637 700/95 |
| 2003/0149501 | A1* | 8/2003 | Tuszynski | G05B 19/41865 700/95 |
| 2006/0253214 | A1* | 11/2006 | Gross | G06F 30/00 705/26.1 |
| 2007/0050070 | A1* | 3/2007 | Strain | G06Q 10/06 700/99 |
| 2007/0129839 | A1* | 6/2007 | Tsubakida | G05B 19/41865 700/121 |
| 2007/0168067 | A1* | 7/2007 | Yaji | G05B 19/41865 700/103 |
| 2007/0293964 | A1* | 12/2007 | Skorepa | G05B 19/042 700/83 |
| 2008/0033592 | A1* | 2/2008 | Okrongli | G05B 19/4083 700/179 |
| 2008/0065258 | A1* | 3/2008 | Baumgartner | G05B 19/40938 700/179 |
| 2009/0048889 | A1* | 2/2009 | Arinez | G06Q 10/06312 705/7.22 |
| 2010/0138017 | A1* | 6/2010 | Vrba | G05B 19/4188 700/97 |
| 2011/0066997 | A1* | 3/2011 | O'Riordan | G06F 30/3323 716/139 |
| 2011/0202689 | A1* | 8/2011 | Koenig | G06F 9/4411 710/9 |
| 2011/0224835 | A1* | 9/2011 | Stenhaug | E21B 37/00 700/282 |
| 2011/0264416 | A1* | 10/2011 | Muller | G05B 19/418 703/1 |
| 2012/0095819 | A1* | 4/2012 | Li | G06Q 30/02 705/14.23 |
| 2014/0067108 | A1* | 3/2014 | Pedigo | G05B 19/41865 700/108 |
| 2014/0143006 | A1 | 5/2014 | Chang | |
| 2014/0244009 | A1* | 8/2014 | Mestas | G16H 40/63 700/91 |
| 2015/0134395 | A1 | 5/2015 | Yang et al. | |
| 2015/0278734 | A1* | 10/2015 | Grant | G06Q 10/06313 705/7.23 |
| 2017/0053050 | A1* | 2/2017 | Kothari | G05B 19/41885 |
| 2017/0075333 | A1* | 3/2017 | Norman | G06F 9/4881 |
| 2017/0091684 | A1 | 3/2017 | Elchlepp | |
| 2017/0109673 | A1* | 4/2017 | Bell | G06Q 50/28 |
| 2017/0160730 | A1* | 6/2017 | Reddy | G05B 19/41865 |
| 2017/0185076 | A1 | 6/2017 | Yamamoto | |
| 2017/0307387 | A1* | 10/2017 | Kohlhepp | G05B 19/4155 |
| 2017/0344666 | A1* | 11/2017 | Mantraratnam | G06Q 50/08 |
| 2018/0129187 | A1* | 5/2018 | Spieker | B25J 9/1676 |
| 2018/0157222 | A1* | 6/2018 | Weatherbee | G05B 19/41865 |
| 2018/0218296 | A1 | 8/2018 | Feiten | |
| 2019/0265683 | A1 | 8/2019 | Schneider | |
| 2020/0175447 | A1* | 6/2020 | Lamparter | G06Q 10/0633 |

FOREIGN PATENT DOCUMENTS

| | | | | |
|---|---|---|---|---|
| DE | 102016002194 A1 | 8/2016 | | |
| DE | 102015205173 A1 | 9/2016 | | |
| DE | 102015116569 A1 | 3/2017 | | |
| DE | 102016124784 A1 | 6/2017 | | |
| DE | 102016007837 A1 | 11/2017 | | |
| DE | 102017120366 A1 * | 3/2019 | | B60W 30/10 |
| WO | WO2016004972 A1 | 1/2016 | | |
| WO | WO2016074730 A1 | 5/2016 | | |

OTHER PUBLICATIONS

PCT International Search Report and Written Opinion of International Searching Authority, corresponding to PCT International Application No. PCT/EP2018/071147 dated Oct. 19, 2018.
Noia, Tommaso Di, et al. "A system for principled matchmaking in an electronic marketplace." International Journal of Electronic Commerce 8.4 (2004): 9-37.
German Search Report for German Application No. 10 2017 213 583.2 dated Jun. 7, 2018.
Grimm, Stephan, Boris Motik, and Chris Preist. "Matching semantic service descriptions with local closed-world reasoning." European Semantic Web Conference. Springer, Berlin, Heidelberg, 2006. pp. 575-589.
Veit, Daniel J. Matchmaking in electronic markets: An agent-based approach towards matchmaking in electronic negotiations. vol. 2882. Springer, 2003. pp. 1-7.
Adamson, Göran, Lihui Wang, and Philip Moore. "Feature-based control and information framework for adaptive and distributed manufacturing in cyber physical systems." Journal of manufacturing systems 43 (2017): 305-315.
Anis, Anas, Wilhelm Schafer, and Oliver Niggemann. "A comparison of modeling approaches for planning in cyber physical production systems." Proceedings of the 2014 IEEE Emerging Technology and Factory Automation (ETFA). IEEE, 2014. pp. 1-8.
European Office Action for European Application No. 18 753 127.2-1222 dated Apr. 26, 2021.

* cited by examiner

METHOD FOR PRODUCTION PLANNING

This application is the National Stage of International Application No. PCT/EP2018/071147, filed Aug. 3, 2018, which claims the benefit of German Patent Application No. 10 2017 213 583.2, filed Aug. 4, 2017. The entire contents of these documents are hereby incorporated herein by reference.

BACKGROUND

The present embodiments relate to production planning.

A new product design regularly involves a product model (e.g., a CAD model and a parts list) and a sequence of manufacturing steps (e.g., in the shape of a work plan) being determined.

In the subsequent production planning, the actual manufacturing process is defined based on the available equipment and the installation specification (e.g., by a description or mapping structure mBOP). Since the production planning is dependent on the available equipment, this method is to be repeated for each manufacturing installation.

Today, the manufacturing process is planned manually for each manufacturing installation. Owing to the high level of time involvement required for this, the market introduction time for new products is long and the manufacture is inflexible. However, precisely these two aims, a short market introduction time and a high level of flexibility, are relevant to many current market trends, such as, for example, manufacture to order or manufacturing services.

In the industry 4.0 context, "plug-and-produce" concepts that permit more flexible production planning are known. These concepts are based on two fundamental approaches.

Firstly, there is provision for central planning: central planning logic is based on task descriptions or aim descriptions and matches these with capability descriptions for machines and devices at manufacturing level. However, the capabilities of machines frequently cannot be expressed completely as a declarative description. This applies to more complex machines, for example.

Secondly, decentralized approaches exist: such approaches require the use of exclusively intelligent machines, which themselves need to have planning capabilities.

However, coordinating functions continue to be necessary, which frequently lead to less-than-optimum solutions and necessitate additional communication complexity.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method that permits improved production planning, such as flexible production planning, and that may handle capability descriptions of different granularity and machines of different complexity is provided.

A method according to one or more of the present embodiments is a method for production planning using a plurality of manufacturing devices. The method involves tasks of a work plan being subjected to a comparison with manufacturing capabilities of the manufacturing devices, and the method involves the result/results of the comparison respectively being taken as a basis for instructing at least one manufacturing device to match manufacturing capability of the at least one manufacturing device with the task/tasks. In one embodiment, the method according to the present embodiments involves the results of the comparison and of the matching being used to record the production planning. The method is computer-implemented or is carried out in computer-aided or computer-based fashion (e.g., using one or more processors).

According to the present embodiments, central production planning based on capability descriptions may thus be linked to local production planning at the level of individual manufacturing devices of a manufacturing installation, depending on the situation. A hierarchic approach avoids the disadvantages associated with central production planning or with local production planning.

The present embodiments thus permit situation-dependent production planning in a production control system (e.g., manufacturing execution system, MES). The production planning is dependent on the result/results of the comparison of the description of the tasks of the work plan (e.g., to a certain extent, on a product-centered basis) with the description of the manufacturing capabilities (e.g., to a certain extent, on an installation-centered basis) and on the respective planning algorithms. In one embodiment, the method involves the comparison being effected not or at least not only syntactically but rather, for example, semantically (e.g., by semantic comparison of the respective description of the task/tasks with the respective description of the manufacturing capability/capabilities). A fundamental idea behind the present embodiments is the situation-dependent decision as to whether the central planning based on the description of the tasks is sufficient or whether local production planning at the level of the manufacturing units (e.g., machines) is to be effected. The method according to the present embodiments renders a central problem of flexible production planning solvable (e.g., bridging the distance between the very abstract task description, at the level of the production control system, and the capability description at machine level, which are frequently not able to be described with the necessary granularity, because parameters are not available).

In one embodiment, the method involves one or more manufacturing device/devices being instructed to perform matching if none of the manufacturing devices have at least one assignable manufacturing capability for at least one task of the work plan (e.g., if the description of the at least one task of the work plan cannot be assigned a description of a manufacturing capability of a manufacturing device). Such a case may arise, for example, if manufacturing descriptions of manufacturing devices are not sufficiently granular or available sufficiently completely, or capability descriptions cannot be specified completely without recourse to a product that is actually to be manufactured or to a manufacturing pass that is actually required.

In one development of the method, the comparison and/or the matching is/are effected semantically and/or by logic expressions (e.g., by description logic and/or predicate logic of first level and/or multiattributive comparison), and/or by constraint-based comparison (e.g., by solving a constraint satisfaction problem (CSP)).

In one embodiment, a semantic comparison is effected, for example, by "complex semantic matchings" (see, for example, S. Grimm, B. Motik, C. Preist: *Matching Semantic Service Descriptions with Local Closed-World Reasoning*," ESWC 2006, pages 575-589 and/or Noia, Tommaso Di et al.: "*A system for principled matchmaking in an electronic marketplace*," International Journal of Electronic Commerce 8.4 (2004), pages 9-37). In one embodiment, the method involves capability descriptions and/or task descriptions and/or context descriptions being used for this semantic comparison, which includes logic expressions (e.g., description logic, and/or predicate logic, at least the first level).

Alternatively or additionally, a semantic comparison may be effected by multiattributive comparison (multiattributive matching) (see, for example, Veit, Daniel: "*Matchmaking in electronic markets: An agent-based approach towards matchmaking in electronic negotiations*," vol. 2882, Springer Science & Business Media, 2003), where task description/descriptions and/or capability description/descriptions and/or at least one or more used, for example, context description/descriptions include lists of attributes, and where there is provision, for example, for a separate comparison function for a multiple or each type of attribute. The comparison function, for example, includes a semantic comparison function and/or character string operation and/or mathematical equation.

In one embodiment, the method involves a description of the task/tasks and may include at least one context description that may be present being transmitted to the respective manufacturing device for the matching. The matching may involve at least one local matching function (e.g., one based on the respective manufacturing device) that may assume logic values (e.g., representing "true" and/or "false" and/or "unknown") being evaluated. In one embodiment, at least one internal simulation and/or at least one movement planning and/or at least one other planning algorithm is used for the matching. In one embodiment, provided that the respective manufacturing device may add a missing capability description, this addition may be output as a result for the method.

The method according to the present embodiments may involve manual matching being effected in the event of at least one nonpositive matching for at least one manufacturing capability. In this development, automated matching alone is thus not necessarily required, but rather, individual control of the automated method continues to be possible in this development.

In the method according to the present embodiments, if the result of the comparison is that all of the tasks of the work plan are able to be assigned manufacturing capabilities of the manufacturing devices in an association, the result of this comparison and/or the association is/are recorded as a result for the method.

In one development of the method, if more manufacturing capabilities are available than required by the work plan, the work plan for the product is refined. In this development, the association of manufacturing capabilities with the work plan may thus be optimized by matching the manufacturing capabilities to the refined work plan.

The method according to the present embodiments may involve the comparison being performed by a production control system.

The method according to the present embodiments may involve a result of the matching being transmitted to the production control system.

The computer program product according to the present embodiments for production planning is configured to carry out a method, as described above.

By contrast, the solutions known to date involve either centralized or decentralized production planning, but not a situation-dependent combination of these two approaches (e.g., based on a level of detail in the capability descriptions of the manufacturing devices).

DETAILED DESCRIPTION

Figure 1:
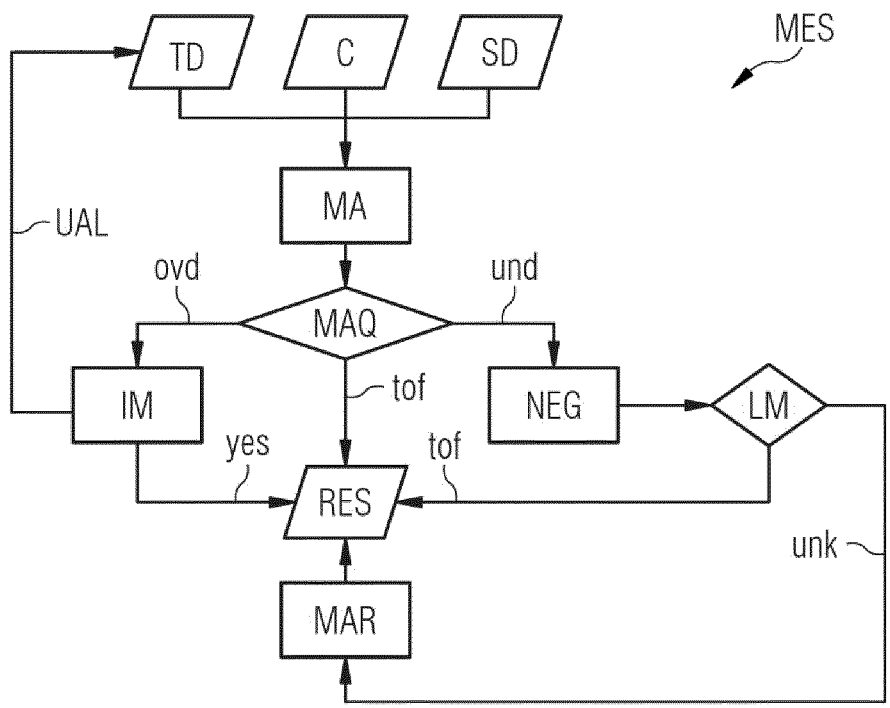
FIG. 1 shows a flowchart for a first exemplary embodiment of a method in a basic outline.

The exemplary embodiment depicted in FIG. 1, for the method according to the present embodiments, shows a flowchart for a production control system MES of a manufacturing installation, which is not depicted explicitly in the drawing. The manufacturing installation includes a plurality of manufacturing devices. The respective manufacturing devices have manufacturing capabilities for the manufacture of products. The manufacturing capabilities of the manufacturing devices are recorded in a capability description SD. The production control system MES contains a work plan including task descriptions TD that the manufacturing installation is to execute in order to manufacture a specific product. In addition to the task descriptions TD, the work plan also includes context descriptions C for the task descriptions. The context descriptions C include the technical context of the respective task (e.g., the temporal relationship with preceding tasks or subsequent tasks of the work plan). In further exemplary embodiments, not depicted separately, which otherwise correspond to the one depicted, the context descriptions C may be dropped without replacement.

In order to plan the manufacturing process, the production control system MES is to compare the task descriptions TD and the capability descriptions SD with one another.

Such a comparison MA may fundamentally take place in different ways.

For example, in the exemplary embodiment depicted, a comparison MA is effected by "complex semantic matchings" (see, for example, S. Grimm, B. Motik, C. Preist: "*Matching Semantic Service Descriptions with Local Closed-World Reasoning*," ESWC 2006, pages 575-589 and Noia, Tommaso Di et al.: "*A system for principled matchmaking in an electronic marketplace*," International Journal of Electronic Commerce 8.4 (2004), pages 9-37), where the capability descriptions, the task descriptions, and the context descriptions are provided by logic expressions (e.g., by description logic or by predicate logic of first level).

In further exemplary embodiments, it is instead or additionally possible for a comparison MA also to be effected by multiattributive comparison ("multi-attributive matching") (see, for example, Veit, Daniel: "*Matchmaking in electronic markets: An agent-based approach towards matchmaking in electronic negotiations*," vol. 2882, Springer Science & Business Media, 2003), where the task descriptions, the capability descriptions, and the context descriptions are lists of attributes, and a separate comparison function is defined for each type of attribute; the comparison function is configured as a semantic comparison function and/or as a character string operation and/or as mathematical equation, for example.

An example in the style of a pseudocode for a multiattributive capability description SD is formed by a capability description for a robot arm, which forms a manufacturing device:

```
{        Capability: "Pick & Place"
         Degrees of freedom: 6 (number)
         Payload: 0 to 3 kilograms }.
```

The multiattributive description may also contain further details pertaining to the robot arm (e.g., serial numbers, manufacturer, type designations, etc.).

The task description TD, illustrated as a pseudocode in the present case, reads as follows, for example:

```
{          Piece length: 200 millimeters
           Piece mass: 0.5 kilogram
           Task: transport }.
```

The multiattributive comparison MA assigns a semantic expression to each relative attribute pair. The semantic comparison is performed for each task and manufacturing capability pair. This is accomplished using background knowledge that formally keeps a record of the relationship between expressions. By way of example, for processing functions, a knowledge base that defines two functions and a relationship between these functions is used.

Knowledge base={transport, pick-and-place, pick-and-place⊆transport).

Based on the knowledge provided by the knowledge base, it may be inferred that the pick-and-place function is a specific manifestation of the more general transport function. In this way, it may be established that there is a match between task and manufacturing capability.

Instead of a or all or in addition to a or both of the aforementioned types of comparison MA, a comparison MA may also be effected by constraint-based comparison (e.g., constraint-based matching); the comparison is effected by virtue of a constraint satisfaction problem (CSP) being solved.

The comparison MA may give different results MAQ.

If all of the task descriptions TD of the work plan have corresponding suitable capability descriptions SD of the manufacturing devices of the manufacturing installation, then the result MAQ of the comparison MA is "true".

If a task description TD and a capability description SD of the manufacturing devices of the manufacturing installation do not go together, then the result MAQ of the comparison MA is "false".

If a suitable capability description SD exists for each task description TD, but, beyond the number of task descriptions TD, there are also additional capability descriptions SD that have no associated task description TD, then the result MAQ of the comparison MA is "overdetermined" ovd.

Accordingly, the result MAQ of the comparison MA is "underdetermined" if, although a suitable task description TD exists for each capability description SD, there are also, beyond the number of capability descriptions SD, additional task descriptions TD that have no associated capability description SD.

If the result MAQ of the comparison MA is "true" or "false", then the result MAQ of the comparison MA is output as result RES using the output tof.

If the result MAQ of the comparison MA is "overdetermined" ovd, it is established that there is an incomplete match IM. In this case, it is either demanded that the work plan be refined by an update UAL, so that the thus adapted task descriptions TD may be taken as a basis for obtaining a result MAQ as "true" or "false", or else it is stipulated that the associated capability descriptions SD are always compatible with the applicable task description TD, so that in the event of an incomplete match IM, the result MAQ "true" or "false" may always be derived solely from the existing incomplete match IM. In this case, the result MAQ is likewise communicated to the production planning engineer as a result RES by the output tof, as described above.

If the result MAQ of the comparison MA is "underdetermined" (e.g., there are task descriptions TD with which no capability description SD may be associated on the basis of the present data), then the capability descriptions SD of the manufacturing devices are possibly not known in sufficiently granular fashion or specified sufficiently completely to conclusively determine the result MAQ of the comparison MA as "true" or "false".

Consequently, the manufacturing devices are instructed to perform matching NEG in order to match suitability of the manufacturing devices for the task description TD with the task description TD. This will typically be the case, for example, for complex and flexible manufacturing descriptions for which the capability description cannot be specified completely without recourse to the product actually to be manufactured or to the manufacturing pass actually required (e.g., in the case of robots or in the case of machine tools).

The task description TD and the context description C that may be present are transmitted to the respective manufacturing device for the matching NEG. The matching is accomplished by evaluating a local matching function LM (e.g., one based on the respective manufacturing device) that may assume the values "true" or "false" or "unknown" unk. The matching function LM uses internal simulations or movement plannings or other planning algorithms, for example. If the manufacturing device is able to add the missing capability description and therefore determine a "true" or "false" result for the matching function LM, then this result is output as result RES for the method by the output tof. If, however, the matching function LM gives an "unknown" unk result despite the matching, then a manual resolution MAR is initiated.

In consideration of an incomplete match IM, it may be assumed as standard that a task description TD is complete and all additional capability descriptions SD that cannot be matched to the task description TD are ignored. A "true" result MAQ may therefore be obtained immediately and communicated to the production planning engineer as a result by the output yes. To keep a transparent record of the ignored capability attributes, the ignored capability attributes are entered into a list of prerequisites that is regularly updated by an update UAL. This list of prerequisites may later be used to provide details of the production specification and the work plan.

Figure 2:
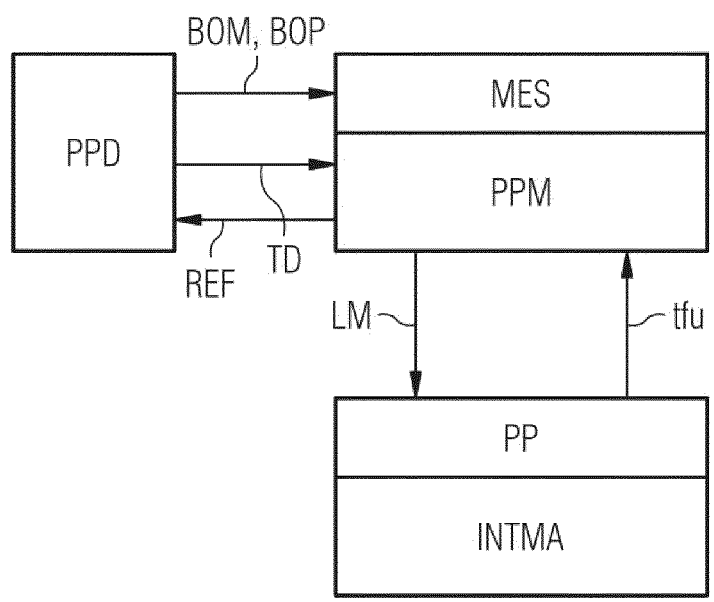
FIG. 2 schematically shows a system architecture including the exemplary embodiment shown in FIG. 1 in a basic outline.

The global system architecture is shown in FIG. 2.

The production control system MES obtains the task descriptions TD from the work plan BOP and the parts list BOM. The work plan BOP and the parts list BOM come from the production plan/production specification PPD.

The task descriptions TD are compared with the capability descriptions SD at the level of the production control system MES by a comparison unit PPM. In the event of incomplete matches IM, the matching of capability description SD and task description TD that the manufacturing device INTMA performs by a matching device PP of the manufacturing device INTMA is transmitted to individual manufacturing devices INTMA. The manufacturing device INTMA returns the result of the matching by the matching function LM to the production control system MES.

The production control system MES adapts the production plan/production specification PPD if needed based on the results MAQ of the comparison MA by the comparison unit PPM.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for production planning using a plurality of manufacturing devices, the method comprising:
    comparing, by a processor of a production control system, tasks of a work plan with manufacturing capabilities of the plurality of manufacturing devices; and
    instructing, by the processor, at least one manufacturing device of the plurality of manufacturing devices to match at least one of the manufacturing capabilities with at least one of the tasks based on a result of the comparison;
    instructing, by the processor, one or more manufacturing devices of the plurality of manufacturing devices to perform matching when no manufacturing devices of the plurality of manufacturing devices have at least one manufacturing capability for at least one of the tasks of the work plan; and
    transmitting a result of the matching to the production control system, wherein the matching when no manufacturing devices of the plurality of manufacturing devices have the at least one manufacturing capability for the at least one of the tasks of the work plan comprises matching, by a manufacturing device of the one or more manufacturing devices, using at least one movement planning, or at least one internal simulation and the at least one movement planning, such that a missing capability description for the manufacturing device is addable based on the at least one movement planning, or the at least one internal simulation and the at least one movement planning; and
    manufacturing a physical product, the manufacturing comprising executing, by at least the manufacturing device, the at least one of the tasks of the work plan based on the transmitted result of the matching.

2. The method of claim 1, wherein the comparison is effected semantically, such that a description of one or more of the tasks is compared with a description of one or more of the manufacturing capabilities.

3. The method of claim 1, wherein the comparing, the matching, or the comparing and the matching are effected by logic expressions, by constraint-based comparison, or by logic expressions and constraint-based comparison.

4. The method of claim 1, wherein the matching of the at least one of the manufacturing capabilities with the at least one of the tasks based on the result of the comparing involves a description of the tasks, a context description that is presentable being transmitted to the respective manufacturing device, at least one planning algorithm being used, or any combination thereof.

5. The method of claim 1, wherein manual matching is effected in the event of at least one nonpositive matching for at least one manufacturing capability.

6. The method of claim 1, wherein when the result of the comparison is that all of the tasks of the work plan are assignable manufacturing capabilities of the plurality of manufacturing devices in an association, the result of the comparison, the association, or the comparison and the association are recorded as a result for the method.

7. The method of claim 1, wherein when more manufacturing capabilities are available than required by the work plan, the work plan for the product is refined.

8. The method of claim 3, wherein the comparing, the matching, or the comparing and the matching are effected by description logic, predicate logic of first level, multiattributive comparison, or any combination thereof, by solving a constraint satisfaction problem, or a combination thereof.

9. In a non-transitory computer-readable storage medium that stores instructions executable by one or more processors of a production control system for production planning using a plurality of manufacturing devices, the instructions comprising:
    comparing, by the one or more processors, tasks of a work plan with manufacturing capabilities of the plurality of manufacturing devices; and
    instructing, by the one or more processors, at least one manufacturing device of the plurality of manufacturing devices to match at least one of the manufacturing capabilities with at least one of the tasks based on a result of the comparison;
    instructing, by the one or more processors, one or more manufacturing devices of the plurality of manufacturing devices to perform matching when no manufacturing devices of the plurality of manufacturing devices have at least one manufacturing capability for at least one of the tasks of the work;
    receiving, by the one or more processors, a result of the matching, wherein the matching when no manufacturing devices of the plurality of manufacturing devices have the at least one manufacturing capability for the at least one of the tasks of the work plan comprises matching using at least one movement planning, or at least one internal simulation and the at least one movement planning, such that a missing capability description for the manufacturing device is addable based on the at least one movement planning, or the at least one internal simulation and the at least one movement planning; and
    manufacturing a physical product, the manufacturing comprising executing, by at least the manufacturing device, the at least one of the tasks of the work plan based on the received result of the matching.

* * * * *